No. 722,909. PATENTED MAR. 17, 1903.
W. RUNGE.
WHEEL ATTACHING DEVICE.
APPLICATION FILED NOV. 21, 1902.
NO MODEL.
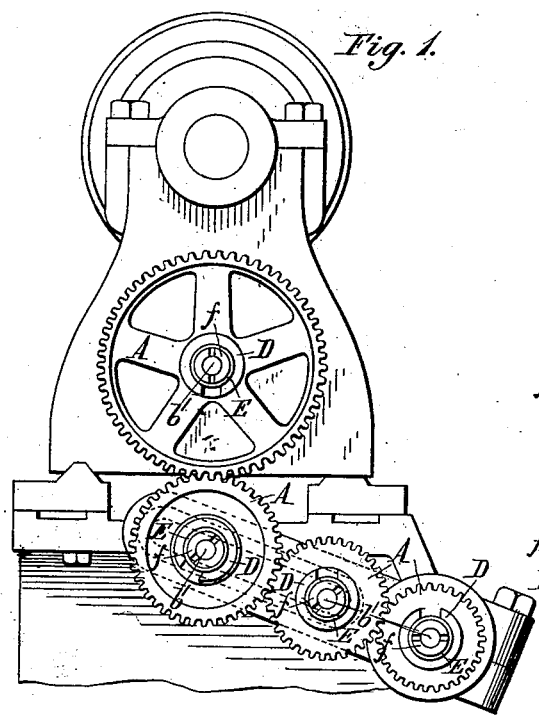
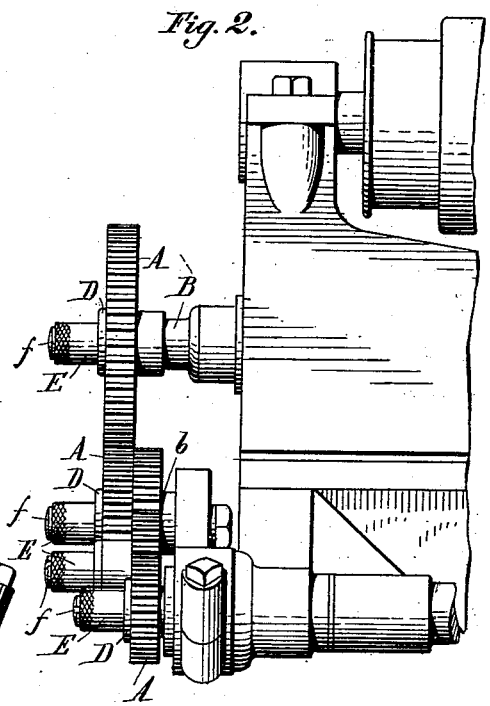
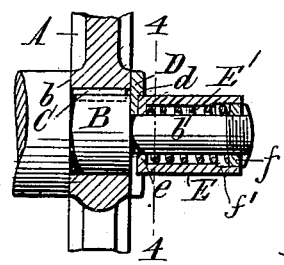
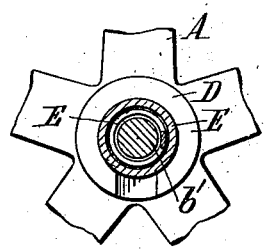
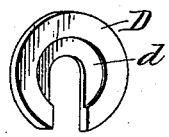
Witnesses:
William Runge
Inventor,
Attorneys.

UNITED STATES PATENT OFFICE.

WILLIAM RUNGE, OF SENECA FALLS, NEW YORK, ASSIGNOR TO THE SENECA FALLS MANUFACTURING COMPANY, OF SENECA FALLS, NEW YORK.

WHEEL-ATTACHING DEVICE.

SPECIFICATION forming part of Letters Patent No. 722,909, dated March 17, 1903.

Application filed November 21, 1902. Serial No. 132,265. (No model.)

*To all whom it may concern:*

Be it known that I, WILLIAM RUNGE, a citizen of the United States, residing at Seneca Falls, in the county of Seneca and State of New York, have invented new and useful Improvements in Wheel-Attaching Devices, of which the following is a specification.

This invention relates more particularly to a device for detachably securing a change-speed gear-wheel for lathes or machine-tools on its shaft or stud; but the invention is not limited to such use and may be employed for securing other wheels or devices on shafts, axles, studs, and the like.

The object of the invention is to provide an efficient and desirable securing device of simple and inexpensive construction which will enable the wheel or the like to be quickly and easily attached to or detached from the shaft and without the employment of a tool.

In the accompanying drawings, Figure 1 is a fragmentary end elevation of a lathe, showing the change-speed gears provided with securing devices embodying the invention. Fig. 2 is a side elevation thereof. Fig. 3 is a longitudinal sectional elevation, on an enlarged scale, of one of the securing devices. Fig. 4 is a transverse section in line 4 4, Fig. 3. Fig. 5 is a perspective view of the slotted washer.

Like letters of reference refer to like parts in the several figures.

In Figs. 1 and 2 of the drawings is shown a train of change-speed gear-wheels which are secured to their respective shafts or studs by securing devices, all of which are similar and one of which is shown in Figs. 3 to 5.

A represents the gear-wheel, and B the shaft, axle, or stud on which the wheel is mounted. The shaft is preferably provided with a shoulder $b$, against which the inner end of the hub of the wheel abuts, and with a reduced end portion $b'$, which projects beyond the wheel. The wheel is caused to rotate with the shaft by an ordinary feather or key C, which is secured to one of the parts and engages in a groove in the other. While the feather or key causes the wheel to rotate with the shaft, it does not prevent the wheel from being slid longitudinally on and off of the shaft. While in the construction shown the wheel is keyed to the shaft to rotate therewith, it will be understood that the invention is also applicable to a wheel or device which is intended to be loose or to rotate on the shaft, axle, or stud.

D represents a wheel-retaining device or washer, which is slotted or bifurcated and is adapted to be placed on the reduced end portion $b'$ of the shaft from one side thereof by engaging the slot or opening of the washer over the reduced portion of the shaft. The washer is of larger external diameter than the shaft and the shaft-hole in the wheel, so that the latter cannot be slipped over the washer and off of the shaft. The washer is provided in its outer face with a socket or depression $d$.

A device is provided for holding the slotted washer in place on the shaft. The device shown in the drawings is constructed as follows: E represents a spring-pressed sleeve, which is loosely mounted on the reduced end portion $b'$ of the shaft and is preferably provided with a milled or roughened portion to enable a better hold on the same. The spring-sleeve is pressed toward the slotted washer by a spring E', which is coiled about the reduced portion of the shaft inside of the sleeve and abuts at its inner end against a shoulder or the like $e$ on the inner end of the sleeve and at the outer end against a nut or other stop $f$ on the end of the reduced portion $b'$ of the shaft. The inner end of the sleeve is pressed by the spring into the circular socket or depression $d$ in the outer face of the slotted washer. When the end of the spring-pressed sleeve is seated in the socket or depression in the washer, the latter is prevented from being moved laterally off of the reduced portion of the shaft, and the spring-pressed sleeve also prevents the washer from being slipped endwise off of the shaft. When the spring-pressed sleeve is in engagement with the washer, the latter cannot, therefore, be removed, and consequently the wheel cannot be slipped off of the shaft.

When it is desired to remove the wheel, the spring-pressed sleeve is pulled outwardly or toward the end of the shaft against the action of its spring out of the socket in the slotted washer. The latter can then be slipped sidewise off of the reduced portion of the shaft, after which the wheel A can be slipped endwise off of the shaft over the spring-pressed sleeve, which latter is of sufficient small diameter to pass through the shaft-opening of the wheel. To attach the wheel to the shaft, it is slipped over the spring-pressed sleeve and the feather engaged in the groove in the wheel. The spring-pressed sleeve is then moved against the action of the spring and the slotted washer slipped sidewise on the reduced end portion of the shaft and the spring-pressed sleeve released. When the sleeve is released, the spring forces its inner end into the socket in the outer face of the washer, and the latter is locked in place. The outward movement of the spring-pressed sleeve is limited by a stop-shoulder $f'$, which engages against the nut on the end of the shaft.

While the annexed claims are drawn in terms to a device for securing a wheel on a shaft, it will be understood that the invention is not necessarily limited to attaching devices for wheels and that the device may also be employed for securing other parts to a shaft, axle, stud, or the like.

I claim as my invention—

1. The combination of a shaft, a wheel removably placed thereon, a slotted washer adapted to be engaged over the shaft from one side thereof, and a device carried by the shaft for holding said washer on the shaft, said device being of a size to permit the wheel to be removed from the shaft longitudinally over said holding device, substantially as set forth.

2. The combination of a shaft, a wheel removably placed thereon, a slotted washer and a spring-pressed holding device mounted on said shaft and provided with a part adapted to engage a part on the washer to hold the latter on the shaft, said holding device being of a size to permit the wheel to be removed from the shaft longitudinally over said holding device, substantially as set forth.

3. The combination of a shaft, a wheel removably placed thereon, a slotted washer provided with a socket or depression, and a spring-pressed sleeve mounted on said shaft and adapted to engage in said socket in the washer to hold the latter on the shaft, substantially as set forth.

4. The combination of a shaft provided with a reduced end portion, a wheel removably placed on said shaft, a slotted washer adapted to be engaged on the shaft from one side thereof, a sleeve surrounding the reduced portion of said shaft, a spring for pressing said sleeve toward said washer, and coöperating parts on said sleeve and washer to hold the latter on the shaft, substantially as set forth.

5. The combination of a shaft having a reduced portion, a wheel removably placed on the shaft, a slotted washer adapted to be engaged on the shaft from one side thereof, a sleeve surrounding the reduced portion of said shaft and adapted to engage in a depression in the outer face of said washer, a spring surrounding the reduced portion of said shaft inside of said sleeve and abutting at one end against a part carried by said sleeve and at the other end against a part carried by said shaft, substantially as set forth.

Witness my hand this 14th day of November, 1902.

WILLIAM RUNGE.

Witnesses:
CHARLES F. HAMMOND,
M. C. KIRK.